United States Patent [19]
Taylor et al.

[11] 4,252,270
[45] Feb. 24, 1981

[54] THERMOSTAT

[75] Inventors: Wesley L. Taylor, Glenview; Warren R. McNabb, Park Ridge, both of Ill.

[73] Assignee: Mark Controls Corporation, Evanston, Ill.

[21] Appl. No.: 918,968

[22] Filed: Jun. 26, 1978

[51] Int. Cl.³ .................... G05D 23/00; F25B 29/00
[52] U.S. Cl. ........................... 236/47; 165/27; 236/87
[58] Field of Search ............ 236/47, 46 R, 87; 337/335, 360, 380; 165/27

[56] References Cited
U.S. PATENT DOCUMENTS

| | | | |
|---|---|---|---|
| 3,212,710 | 10/1965 | Nilles | 236/47 |
| 3,305,172 | 2/1967 | Duchek et al. | 236/47 X |
| 3,813,034 | 5/1974 | Lewis et al. | 236/87 |

Primary Examiner—William E. Wayner
Attorney, Agent, or Firm—Hume, Clement, Brinks, Willian & Olds, Ltd.

[57] ABSTRACT

An improved thermostat having two modes of operation selected by a pressure signal from a central source, which includes a separate set point for each mode of operation. Each set point has a scale which is clearly visible without removal of any parts of the thermostat. Each set point is also adjustable either by an adjuster that can be operated by occupants or only by authorized personnel having a tool fitting the opening in the set point adjustor. Adjustors can be provided with restrictors which limit set point adjustment to a predetermined range of temperatures and which can be adjustable by authorized personnel, or can be factory set.

7 Claims, 7 Drawing Figures

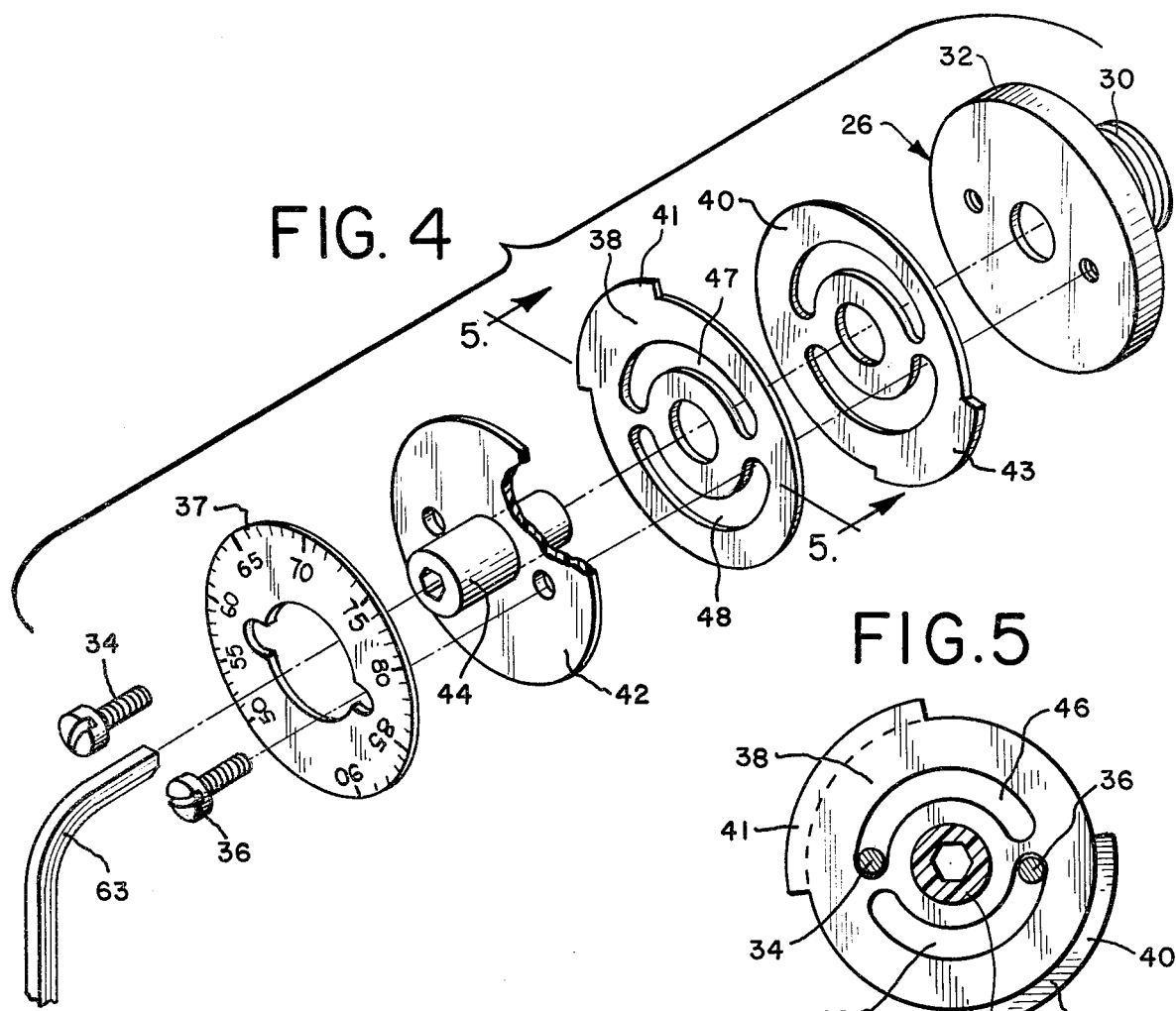
FIG. 4
FIG. 5
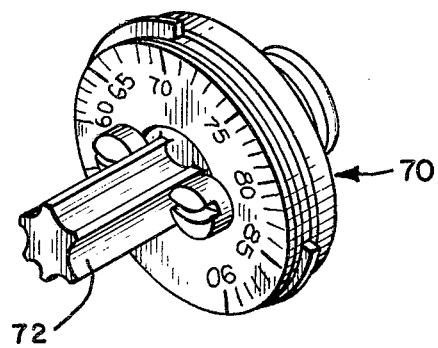
FIG. 6
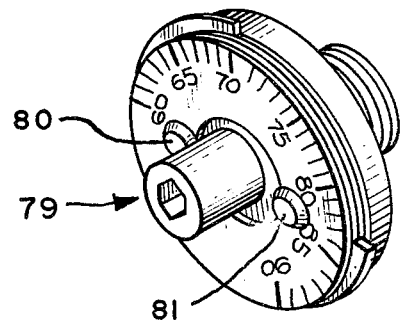
FIG. 7

THERMOSTAT

BACKGROUND OF THE INVENTION

This invention relates to temperature control systems, and in particular to thermostats having two operating control modes.

In many temperature control systems it is desirable to provide alternative modes of temperature control and means for selecting the desired control mode. Such temperature control systems are especially useful in large public buildings, such as schools, hospitals, and office buildings, in which respective rooms or distinct building areas are provided with individual thermostats. To achieve two-mode temperature control in such cases without the expense, inefficiency, and complexity of providing separate controls for each control mode, the individual thermostats are provided with means for locally accomplishing two-mode thermostatic control and with means for switching from one temperature control mode to the other in response to a signal from a central control station.

Throughout this disclosure "control mode" means a specific manner of controlling temperature. For example, in office buildings one control mode is generally provided during business hours, and another control mode is provided for nights, weekends, and holiday, periods when the building is generally not occupied. Similarly, in another application one control mode can be the heating cycle, and the second control mode can be the cooling cycle.

An efficient system for controlling temperature in two operating modes and for switching numerous thermostats located in various locations from one operating mode to the other in response to a central control signal is disclosed in the U.S. Pat. No. 3,305,172, which is incorporated herein by reference. In that system the central control station can provide pressure signals of two magnitudes. If the pressure signal of a low magnitude is transmitted from the central control source, all thermostats receiving that signal operate in the first control mode. When the low magnitude pressure signal is replaced by a high magnitude pressure signal, the thermostats receiving that signal automatically switch to the second mode of operation which is maintained until a low magnitude pressure signal is again transmitted from the central control source.

The present invention provides an improved thermostat of the type disclosed in U.S. Pat. No. 3,305,172, for use in the temperature control systems having two control modes of operation. The improved thermostat of the present invention provides solutions to problems generated by the energy conservation programs. It greatly enhances the enforceability and reduces the cost of such programs. For example, government rules and regulations set certain limits as to maximum temperatures in government offices during the winter and as to minimum temperature during the summer. These rules are subject to change in certain circumstances as during energy shortages caused by severe weather, strikes, etc. Similarly, private industry and business, in order to save costs and to promote energy conservation, set it own rules regarding thermostat settings which are also subject to change. Since in most buildings there are numerous thermostats located in different rooms, the checking of the settings of thermostats, and the adjustments of the settings to comply with current rules is a time-consuming task. Any improvement which permits a quicker determination of settings and a more effecient adjustment of the settings, is of immense value. Another reason for occasional checking and adjusting of settings of thermostats is that some individuals refuse to cooperate with, and indeed, occcassionally sabotage energy saving programs by changing the settings of thermostats. Thus, there is a need for a thermostat having separate set points for both modes of operation, which can be easily and efficiently inspected and/or adjusted by authorized personnel having appropriate tools, but not by occupants of the room, or are adjustable by occupants only in one of two control modes. Especially needed are thermostats having set points adjustable within predetermined limits which cannot be easily changed or cannot be changed at all.

A problem in connection with thermostats having heating and cooling control modes is that such thermostats frequently have a single set point. In a dual duct system, when the temperature exceeds the set point temperature, a single set point thermostat would activate a cooling function; whereas, when the temperature falls below the set point temperature, the thermostat would activate a heating function. Such operation often leads to waste of energy where cooling and heating are alternatively activated as the temperature of the enclosure fluctuates around the set point and in practice it may occasionally lead to simultaneous heating and cooling of the same room.

The present invention alleviates the problems recognized by the inventors.

Thus, one object of this invention is to provide a thermostat operating in one of two control modes selected by a pressure signal from a central source, the settings of which are visible without removal or displacement of any parts of the thermostat and easily efficiently adjustable by authorized personnel but not the occupants of the space.

Another object of the invention is to provide a two-mode thermostat having separate, clearly visible from outside, set points for each mode of operation, which set points can be easily and efficiently adjusted by occupants without removing any parts of the thermostat but only within limits set by restricting means accessible only to authorized personnel.

A further object of the invention is to provide a two-mode thermostat having in each mode of operation a separate set point which is clearly visible without removing any parts of the thermostat and which can be adjusted without removal of any parts of the thermostat but only within predetermined limits which are factory set and cannot be altered even by maintenance personnel.

Still another object of the invention is to provide a two-mode thermostat having in each mode of operation a separate, clearly visible from outside, set point which is independently adjustable only by authorized personnel and only within a predetermined temperproof temperature range without removing any parts of the thermostat.

A still further object of the invention is to provide a thermostat having in each mode of operation a separate, clearly visible, set point which is adjustable by occupants without removing any parts of the thermostat but only within predetermined limits which are permanently set.

Othe objects of the invention will become apparent to those skilled in the art upon studying this disclosure.

BRIEF DESCRIPTION OF THE INVENTION

A two-mode thermostat has a separate set point for each mode of operation which is selected by a pressure signal supplied form a central source. The setting of each set point of the thermostat is clearly visible from outside and independently adjustable without removal of any parts of the thermostat. The adjustment of the set point can be limited to those who have a special tool and the adjustment can be further limited by restrictions on the set point mechanism to a predetermined range of temperature. The restriction can be adjustable only by authorized personnel or factory set and temperproof.

A thermostat of the type having two modes of operation which are selected by a pressure signal from a central source includes set point dials threaded onto a casing bridge. The rotation of the dial displaces a bimetallic surface controlling exit of pressurized air, thereby changing a control signal. The dial set point portion of each is visible through the cover and the set point adjustment mechanism can include a knob which can be adjusted by occupants. In the alternative, the set point adjustment mechanisms of one or both dials can include an opening which is shaped to correspond to a tool available only to authorized personnel. The dials can include restrictor plates extending beyond the circumference of the dial; and the casing bridge can include a post which restricts rotation of the dial to the arc of the dial which does not have a restrictor plate thereon. The restrictor plates can either be adjustable by authorized personnel after removal of the cover, or be factory set and not adjustable.

Other aspects of the invention will become apparent to those skilled in the art upon studying this specification and the appended claims.

BRIEF DESCRIPTION OF THE DRAWINGS

FIG. 4 is an exploded view of a dial screw of the embodiment of the present invention shown in FIG. 1.

FIG. 5 is a plane view taken along line 5—5 of FIG. 4.

FIG. 6 is a perspective view of a dial screw of another embodiment of the present invention.

FIG. 7 is a perspective view of a dial screw of still another embodiment of the present invention.

DETAILED DESCRIPTION OF THE INVENTION

It has been discovered that the time-consuming and inefficient task of inspecting and adjusting two-mode thermostats to assure that their settings comply with applicable rules can be streamlined by providing for each mode of operation a separate scale which is clearly visible without removing or displacing any parts of the thermostat, and which has a set point adjustable without removing any parts of the thermostat. Additionally, the necessity and frequency of inspections to assure that the set point settings of the thermostats in each mode of operation have not been tempered with is eliminated by incorporating in the thermostat one or more security features in accordance with the present invention. One or both modes of the thermostat can be provided with adjusting means which are adjustable without removing any parts of the thermostat but only by a special tool available to authorized personnel and not generally available to the occupants. Adjusting means for each set point can also include restricting means for preventing selection of a set point temperature outside a predetermined range of temperatures. The restricting means can, in accordance with this invention, be adjustable only after removing the thermostat cover or can be factory set to prevent tempering even by personnel authorized to maintain or inspect thermostats. In connection with thermostats having a heating control mode and a cooling control mode, the adjusting means and restricting means constructed in accordance with this invention can assure that in a predetermined range of temperatures the thermostat will not activate either the cooling or the heating system.

Figure 1:
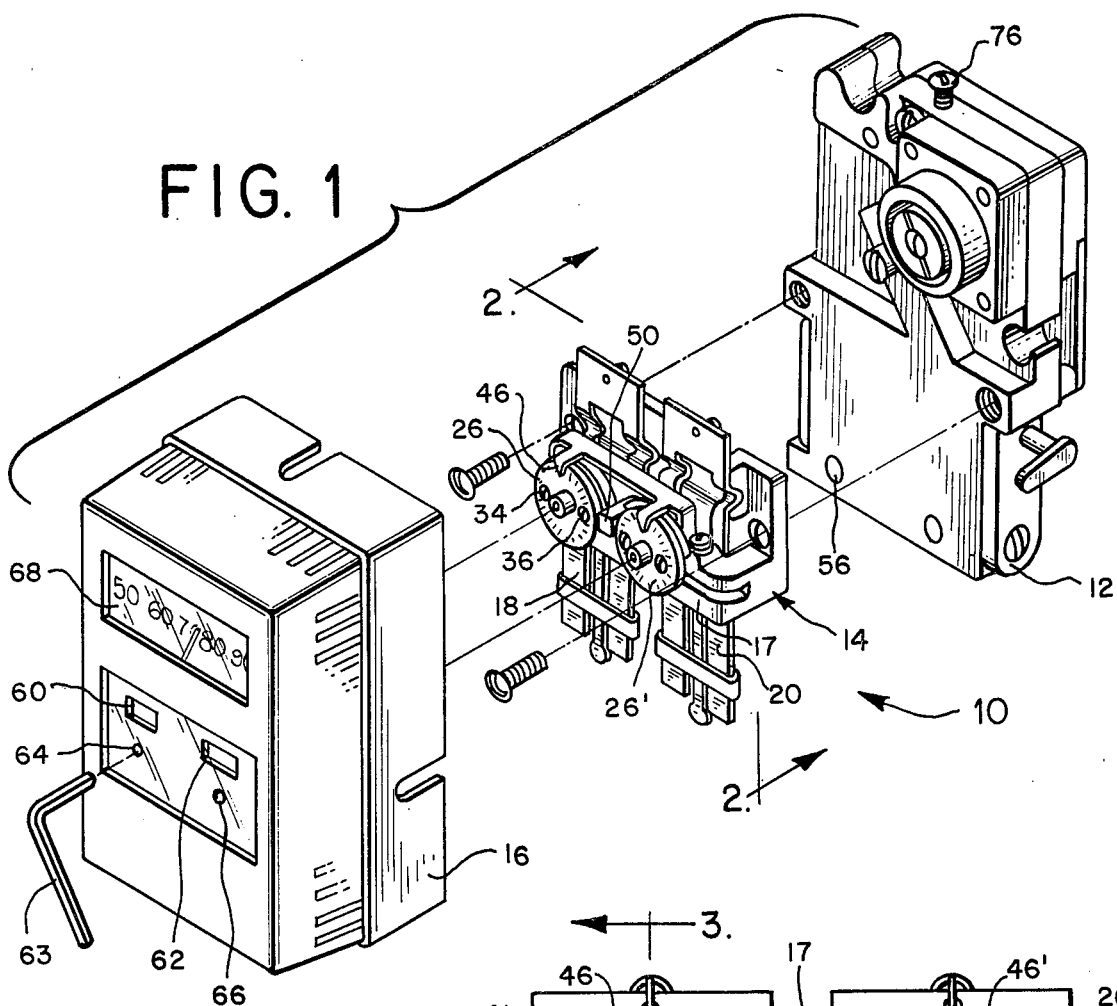
FIG. 1 shows an exploded view of one embodiment of the present invention.

The drawings depict preferred embodiments of a thermostat constructed in accordance with this invention. Referring now to FIG. 1, there is shown a thermostat designated generally by numeral 10. The thermostat 10 includes a conventional chassis 12, a control assembly 14, and a cover 16. The control assembly 14 includes a bridge 17 extending over bimetallic elements 18 and 20. Threaded openings (not shown) though the bridge 17 are provided directly above each of the bimetallic elements 18 and 20 to accommodate dial screws 26 and 26'. As shown in FIG. 1 and 4, the dial screw 26 includes a threaded stem 30 and a flat circular head 32. Adjusting screws 34 and 36 secure the dial temperature scale plate 37, which has marked thereon Celsius or Fahrenheit degrees. The same adjusting screws 34 and 36 also secure restrictors 38 and 40 located on the head 32 and adjusting plate 42 which has a tool receiver 44. An indicator 46 mounted on the bridge 17 and extending directly above the temperature scale plate 37 indicates the set point setting of the thermostat when it is operated in the first control mode.

Figure 3:
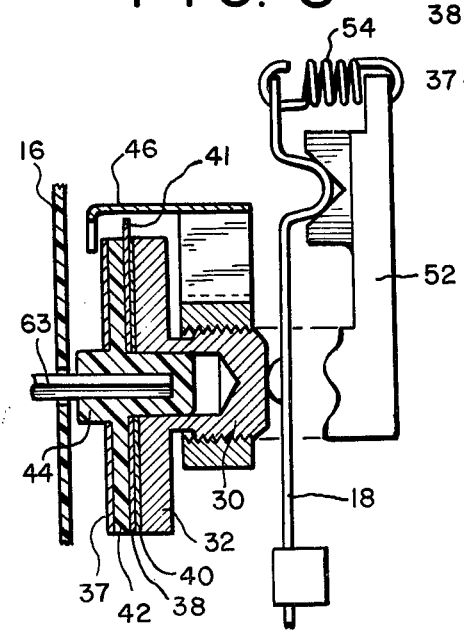
FIG. 3 is a cross-sectional view taken along line 3—3 of FIG. 2.
Figure 2:
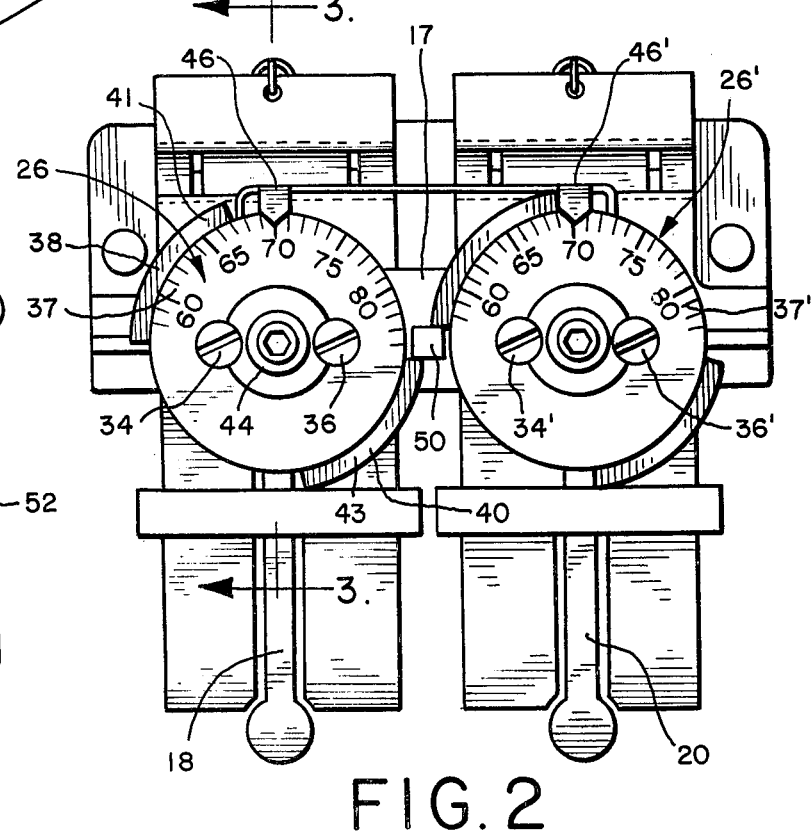
FIG. 2 is a plane view of the set point control assembly of the embodiment of the present invention shown in FIG. 1.

The details of the construction of restrictors 38 and 40 are shown in FIGS. 4 and 5. Each restrictor 38 and 40 includes slots 47 and 48, respectively, to accommodate a respective adjusting screw 34 or 36. The angular position of each restrictor 38 and 40 on the dial screw 26 can be varied by loosening the screws 34 and 36 and moving the restrictor. Sections 41 and 43 of each restrictor 38 and 40 respectively, extend far enough beyond the edge of the head 32, to prevent its rotation past a post 50 located at the center of the bridge 17. The two restrictors 38 and 40 together provide a predetermined arc through which the dial screw 26 cn be rotated. Accordinaly, the permissible set point temperatures selected by rotating the dial screw 26 are limited and controlled by the position of the restrictors 38 and 40. As shown in FIG. 3, the end of the threaded stem 30 is in contact with the bimetallic element 18 and is pivotally mounted near one end to the base 52 and biased against the threaded stem 30 by a spring 54. Consequently, the rotation of the threaded stem 30 causes a displacement of the bimetallic element 18. The displacement of the bimetallic element 18, in turn, varies the pressure on nozzle 56, thereby providing requisite first mode control based on the set point position.

The dial screw 26' and its accessories corresponding to those of screw 26 are on the other side of the post 50, and are designated on the drawings by the same numerals but followed by prime symbols. The dial screw 26' and its accessories provide for controlling the second central mode.

When the thermostat 10 is assembled the indicator 46 and a portion of the temperature scale plate 37 pointed to by the indicator 46 are clearly visible through a window 60 in the cover 16. Similarly, the indicator 46' and a portion of the temperature scale plate 37' pointed to be the indicator 46' are clearly visible through a window 62 in the cover 16. The cover 16 also includes tool openings 64 and 66 corresponding to tool receivers 44 and 44', respectively, and a coil thermometer 68. The scale 70 and the indicator 72 of the thermometer 68 are clearly visible through a window 74. The cover 16 is mounted to the remainder of the thermostat 10 by temperproof cover screw 76.

In operation, whenever the thermostat 10 needs to be inspected and/or adjusted, an operator can ascertain the settings for both modes of operation merely by observing windows 60 and 62. If an adjustment of the set point in the first control mode is necessary, he can insert a tool, such as an allen ranch 63 through the opening 64 into the receiver 44 and turn the dial screw 26 to the desired position, thereby setting the set point for the first control mode. Similarly, if adjustment of the set point in the second control mode is required, the operator can insert the tool through the opening 66 into the receiver 66 and turn the dial screw 66' to the desired position.

It should be noted that the operator can vary the position of each set point only within the limit predetermined by the position of the restrictors 38 and 40 in the first control mode, and 38' and 40' in the second control mode. The operator can change the setting of the restrictors 38 and 40 by removing the temperproof cover screw 76, removing the cover 16 and then loosening up adjusting screws 34 and 36. Once adjusting screws 34 and 36 are loosened, the restrictors 38 and 40 can be moved to the desired position thereby setting a new range of set point temperatures. The screws 34 and 36 are then tightened and the cover 16 replaced and secured by the temperproof screw 76. The restrictors 38' and 40' are adjusted in the same manner.

It should also be noted that internal operation of the thermostat itself is conventional; the operation of the particular thermostat is used in connection with embodiments described herein and disclosed in detail in U.S. Pat. No. 3,305,172.

In some applications it may be desirable to permit the occupants to change the setting of the set point within predetermined limits in one or both modes of operation. In that event, the thermostat's tool receiver can be replaced by an appropriate knob extending through the cover of the thermostat. An adjusting screw 70, shown in FIG. 7, includes a knob 72 instead of a tool receiver.

In other applications, it may be desirable to permanently restrict the limits of temperatures for set points so that even maintenance personnel cannot adjust them. The adjusting screws are then replaced by bolts or other securing means which cannot be loosened or removed without damage to the thermostat, regardless of the availability of special tools. The permanent securing means can be factory pre-set and guarantee that a certain temperature range for each mode of operation is not exceeded. For example, dial screw 79 depicted in FIG. 7 includes permanent securing means 80 and 81 instead of adjusting screws 34 and 36.

Of course, in still other applications it may be desirable to use a combination of the features described above for each control mode. For example, in one control mode the adjusting screw can include a knob and the restrictors can be permanently secured, whereas in the second control mode of the same therostat the adjusting screw can include a tool receiver and the restrictors can be adjustable by loosening adjusting screws. Furthermore, it should be understood that although this invention is described in connection with a particular thermostat, other two-mode thermostats can also be utilized. All these modifications and other modifications and changes that fall within the spirit of this invention are intended to be included within its scope as defined by the appended claims.

We claim:

1. In an improved thermostat of the type having two control modes and means to switch from one control mode to the other, said thermostat including two bimetallic elements each regulating the control pressure by exerting pressure on a pin inside an exhaust nozzle, the improvement comprising:

a control assembly having a bridge extending above said bimetallic elements, said bridge having two threaded openings through said bridge in locations corresponding to the locations of the bimetallic elements;

two dial screws, each threaded into said threaded openings and extending through the bridge to contact the bimetallic elements, said bimetallic element being biased against said dial screw;

two tool receivers secured to each of said dial screws;

two temperature scales each secured on one of said dial screws;

two set point indicators mounted to said bridge and pointing to said temperature scale; and, a cover having windows in locations corresponding to the location of reading pointed to by each set point on each temperature scale and having two holes in locations corresponding to said tool receivers, so that said dial screws can be adjusted by a tool fitting in siad tool receivers without removing said cover.

2. An improved thermostat as claimed in claim 1 further comprising restricting means to limit the extent to which each dial screw can be turned, thereby limiting the choice of set point temperatures that can be selected.

3. An improved thermostat as claimed in claim 2 wherein said restricting means is adjustable.

4. An improved thermostat as claimed in claim 2 wherein said restricting means is permanently set.

5. An improved thermostat as claimed in claim 2 further comprising at least one knob permanently mounted and fitting in each tool receiver.

6. An improved thermostat as claimed in claim 2 wherein one set point indicates cooling set point and the other set point indicates heating set point, said restricting means of each dial screw being set to provide a range of temperatures at which neither heating nor cooling is indicated by the thermostat.

7. An improved thermostat as claimed in claim 2 wherein one set point indicates day set point temperature and the other set point indicates night set point temperature.

* * * * *

UNITED STATES PATENT AND TRADEMARK OFFICE
CERTIFICATE OF CORRECTION

PATENT NO. : 4,252,270

DATED : February 24, 1981

INVENTOR(S) : Wesley L. Taylor and Warren R. McNabb

It is certified that error appears in the above—identified patent and that said Letters Patent is hereby corrected as shown below:

Column 1, line 27, delete "holiday," and insert therefore --holidays,--.

Column 1, line 62, delete "it" and insert therefore --its--.

Column 2, line 1, delete "effecient" and insert therefore --efficient--.

Column 2, line 35, insert -- and -- after "easily".

Column 2, line 67, delete "Othe" and insert therefore --Other--.

Column 3, line 5, delete "form" and insert therefore --from--.

Column 4, line 26, delete "though" and insert therefore --through--.

Column 4, line 29, delete "FIG." and insert therefore --FIGS.--.

Column 4, line 52, delete "cn" and insert therefore --can--.

Column 4, line 53, delete "Accordinaly" and insert therefore --Accordingly--.

Column 5, line 7, delete "be" and insert therefore --by--.

UNITED STATES PATENT AND TRADEMARK OFFICE
CERTIFICATE OF CORRECTION

PATENT NO. : 4,252,270

DATED : February 24, 1981

INVENTOR(S) : Wesley L. Taylor and Warren R. McNabb

It is certified that error appears in the above—identified patent and that said Letters Patent is hereby corrected as shown below:

Column 5, line 27, delete "66" and "66'" and insert therefore --44-- and --26'--.

Column 6, line 6, delete "therostat" and insert therefore --thermostat--.

Column 6, line 42, delete "siad" and insert therefore --said--.

Column 6, line 45, after "comprising" insert --:--.

Signed and Sealed this

Tenth Day of November 1981

[SEAL]

Attest:

GERALD J. MOSSINGHOFF

Attesting Officer   Commissioner of Patents and Trademarks